Jan. 18, 1944.  W. R. GRISWOLD ET AL  2,339,473
MOTOR VEHICLE
Filed Sept. 27, 1940    4 Sheets-Sheet 1

INVENTORS
Walter R. Griswold and
Forest R. McFarland
BY
Tibbetts & Hart
attorneys

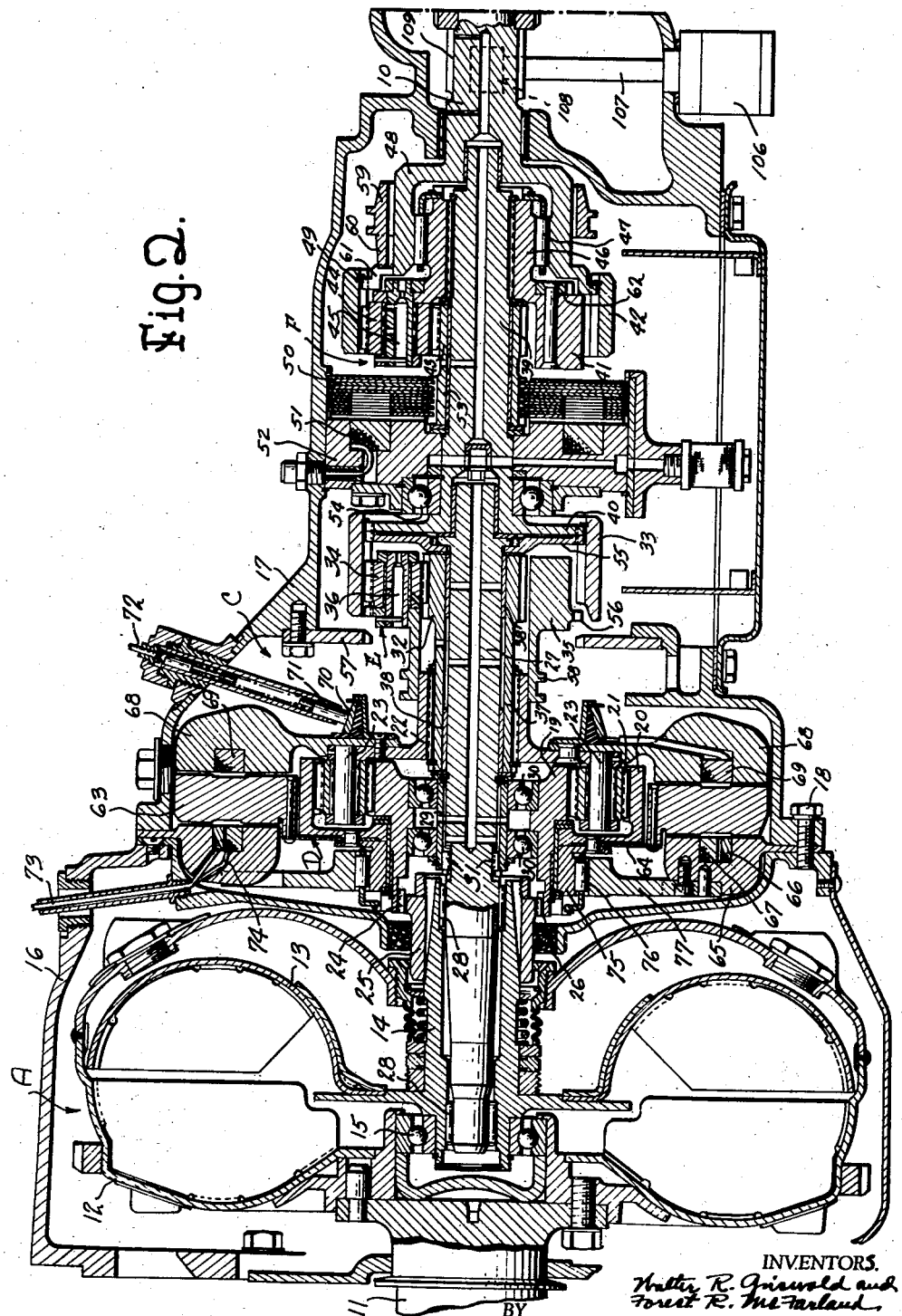

Jan. 18, 1944.    W. R. GRISWOLD ET AL    2,339,473
MOTOR VEHICLE
Filed Sept. 27, 1940    4 Sheets-Sheet 3

INVENTORS
Walter R. Griswold and
Forest R. McFarland
BY
Sibbetts & Hart
Attorneys Jan. 18, 1944. W. R. GRISWOLD ET AL 2,339,473
MOTOR VEHICLE
Filed Sept. 27, 1940 4 Sheets-Sheet 4

INVENTORS
Walter R. Griswold and
Forest R. McFarland
BY
Tibbetts & Hart
Attorneys Patented Jan. 18, 1944

2,339,473

UNITED STATES PATENT OFFICE 2,339,473

MOTOR VEHICLE

Walter R. Griswold, Detroit, and Forest R. McFarland, Huntington Woods, Mich., assignors to Packard Motor Car Company, Detroit, Mich., a corporation of Michigan Application September 27, 1940, Serial No. 358,669

5 Claims. (Cl. 74—262)

This invention relates to drive mechanism and more particularly to the type of motor vehicle drive mechanism shown in Patent No. 2,292,633, dated August 11, 1942.

An object of this invention is to provide a change speed gearing that can be readily connected with and disconnected from a drive mechanism as a unit.

Another object of the invention is to provide change speed gearing of a planetary gearing type in which the gear relation is selected magnetically under the control of several instrumentalities responsive to regulation by the accelerator pedal operation.

Another object of the invention is to provide a magnetic regulation of change speed gearing that will respond quickly to control mechanism and in a relation such that engaging parts will be substantially synchronized.

Still another object of the invention is to provide a control for magnetically regulated change speed gearing in which torque will be automatically reduced in conjunction with the establishment of a circuit to cause a change in the drive.

Another object of the invention is to provide an automatic control for magnetically regulated change speed gearing of motor vehicles in which shaft speed and engine vacuum conditions jointly determine the driving connection as dictated by the position of the accelerator pedal.

These and other objects of the invention will appear from the following description taken in connection with the drawings, which form a part of the specification, and in which:

Fig. 2 is a vertical sectional view taken longitudinally through the power transmission mechanism;

Figure 1:
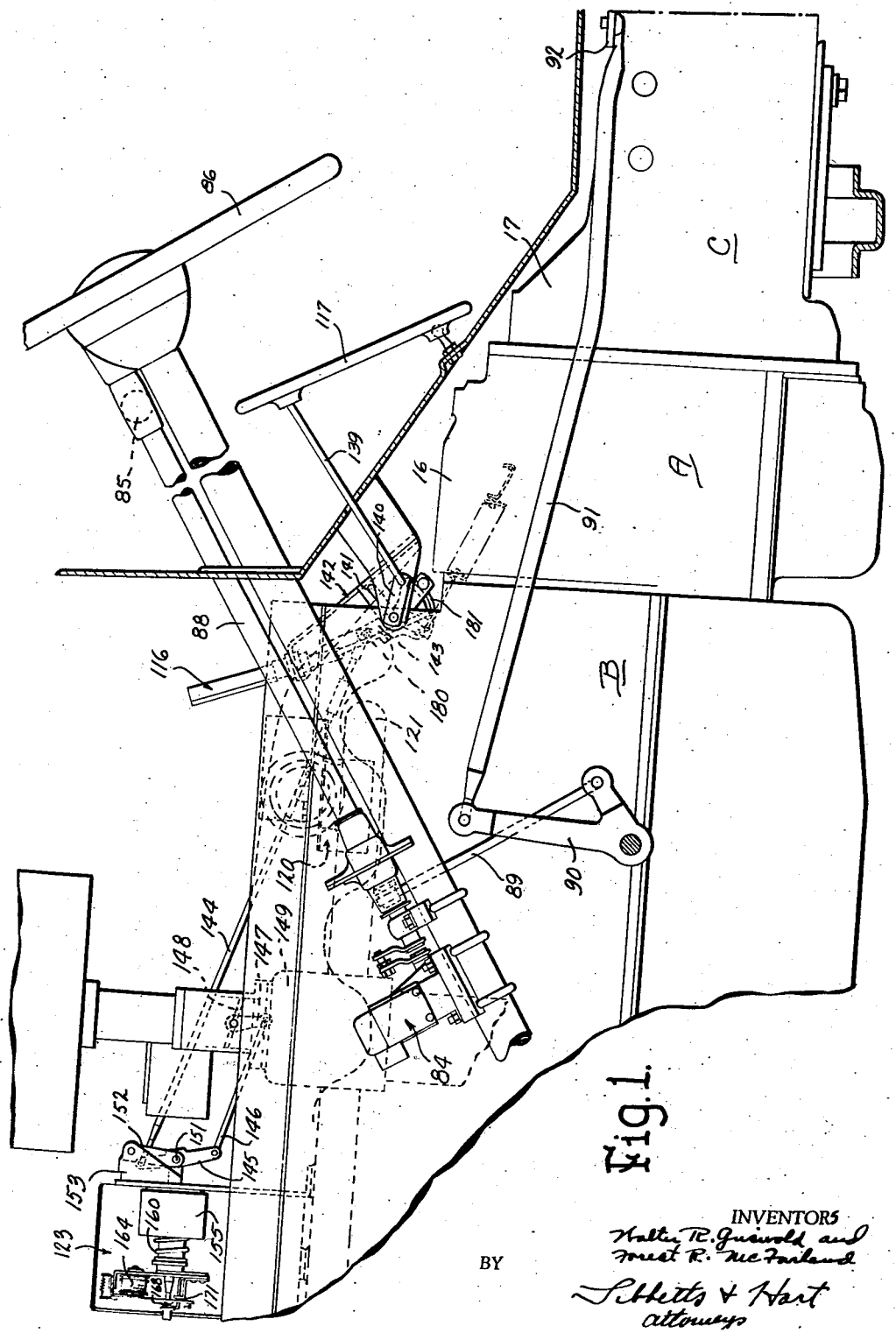
Fig. 1 is a fragmentary side elevational view of a motor vehicle having the invention incorporated therewith.

The power transmission mechanism shown in the drawings can be utilized as a drive for various purposes, such as for automobiles. Such mechanism comprises generally a fluid coupling unit A, an engine unit B and a change speed unit C. The drive passes from the change speed unit through a tail shaft 10 to the usual vehicle traction wheels (not shown).

The fluid coupling may be of any suitable construction for transmitting drive from the crankshaft or drive shaft 11, and comprises a driving vane portion 12, fixed to the drive shaft, and a driven vane portion 13 that includes a driving shaft 14. This driving shaft extends into the hub of the driving vane of the fluid clutch and is carried therein by a suitable bearing 15.

The fluid clutch unit includes a casing 16 and the change speed unit includes a casing 17, such casings being detachable and secured together by suitable detachable means such as bolts 18. The change speed gearing casing carries the tail shaft 10 and three aligned sets of planetary gearing D, E and F.

The forward planetary gearing D comprises a sun gear 19, a ring gear 20, planet gears 21 and a carrier 22 for shafts 23 on which the planet gears are rotatably mounted. The sun gear has a forwardly extending sleeve on which is formed internal teeth 24 providing one element of a positive clutch. The driving shaft 14 has a clutch sleeve 25 splined thereon and such sleeve is provided with external teeth 26 that form the other element of a positive clutch. These teeth 26 can be engaged with and disengaged from teeth 24 by an axial movement when the change speed unit is moved into and out of assembled relation with the clutch unit. This detachable clutch 24, 26 provides the power connection between the fluid clutch unit and the forward planetary gearing of the change speed gearing unit.

The driving shaft 14 is in the form of a sleeve that telescopes the forward end of a bearing shaft 27, the latter shaft being carried in roller bearings 28 mounted in the ends of the driving shaft. A splined bushing 29 is mounted on shaft 27 inside of the sun gear 19 and keys 31 fix the bushing to the shaft. Two ball bearing units 30 are mounted on the bushing and support the sun gear 19.

The middle planetary gearing unit E comprises sun gear 32, ring gear 33, pinions 34 and carrier 35 for pinion supporting shafts 36. The sun gear has a forwardly extending sleeve 37 that is splined to carrier 22 of the planetary gearing unit D and suitable bearings 38 are provided between the sun gear and supporting shaft 27. A shaft 39 extends rearwardly from the planetary gearing unit E and has an enlarged end 40 with peripheral teeth that engage with the teeth of ring gear 33. This shaft 39 provides the power connection between units E and F.

The planetary gearing unit F comprises a carrier 41, ring gear 42, sun gear 43 and pinion gears 44 mounted on shafts 45 fixed to the carrier. The carrier is splined to shaft 39 and has a rearwardly extending hub portion 46 provided with cam surfaces with which rollers 47 ride to clutch the carrier in a one-way driving relation with the enlarged forward end 48 of the tail shaft 10. The enlarged end of the tail shaft is also formed with teeth 49 that are engaged with the teeth of ring gear 42.

When the planetary gearing unit is free to idle, drive from shaft 39 flows directly to tail shaft 10 through the one-way clutch rollers and the carrier extension 46 that is splined to shaft 39. When the sun gear 43 is held from rotation, the drive is through the planetary gearing to the tail shaft and as the pinion gears track around the sun gear, the ring gear will rotate faster than shaft 39 and will rotate the tail shaft faster than direct drive through the rollers 47. The sun gear 43 is held stationary by magnetic brake means in which plates 50 are drawn into frictional engagement by the energizing of a magnet coil 51 in a backing member 52. The plates are alternately splined to casing 17 and to a sleeve 53 projecting forwardly from the sun gear 43. The backing member is secured interiorly of casing 17 and carries a bearing 54 in which the forward portion of shaft 39 is rotatably mounted. The rear end of shaft 39 is mounted in the hollow front end of the tail shaft and the front end of shaft 39 is hollow and receives the rear end of supporting shaft 27. At the forward end of shaft 39 is a clutch or coupling member 55 having internal teeth meshing with teeth on a flanged portion of shaft 27 and external teeth engaging with the teeth of ring gear 33.

The carrier 35 is formed with teeth 56 that can be engaged with teeth on plate 57 when shifted forwardly. When such teeth are engaged the carrier of the central planetary gearing is held stationary and reverse drive through the planetary gearing unit E will be established. When the teeth 56 are shifted rearwardly to engage the teeth of ring gear 33, as shown in Fig. 2, then the planetary gearing is locked and the drive through unit E will be direct. In order to provide for this shifting, the carrier is formed with a forwardly extending sleeve 58 that is engaged by a suitable shift mechanism.

When the positive direct drive between shafts 39 and 10 is desired, clutch 59 is shifted forwardly. The clutch has forward fingers 60 that project through windows 61 in the radial flange at the front end of the tail shaft and on such fingers are teeth adapted to be meshed with teeth on a ring clutch member 62 fixed to carrier 41. The clutch member 59 rotates with the tail shaft because of the fingers projecting into the windows and when moved forwardly to engage clutch ring 62, a two-way positive drive is provided between carrier 41, splined to shaft 39, and shaft 10. The mechanism for operating sleeve 58 and clutch 59 can be manually operated and can be interconnected to engage the direct positive clutch when reverse drive is established through the gearing unit E.

Direct or reduced drive can be established through the forward planetary gearing unit D. An armature ring 63 encircles ring gear 20 and is fixed thereto by a flexible ring connection 64. Forwardly of the armature and suitably fixed to casing 17 is a magnet ring 65 carrying two coils 66 and 67, and rearwardly of the armature is another magnet ring 68 fixed to carrier 22 and carrying coil 69. Current is supplied to coil 69 by a contact ring 70, brush 71 and conductor means 72 while current is supplied to coils 66 and 67 by conductors 73 and 74. It will be understood that the armature is shifted forwardly or rearwardly by the magnets and when in rearmost position, the ring gear 20 will be locked to the carrier 22 so that direct drive between shaft 14 and sleeve 37 is established. When the armature is in forward position, ring gear 20 is held stationary so that the planetary pinions 21 will track around it to provide a reduced drive through the gearing from shaft 14 to sleeve 37.

The forward planetary gearing unit is shown provided with a one-way clutch which may replace the forward magnet or may be used in conjunction therewith. A hub clutch element 75 is fixed to ring gear 20 and has cam surfaces on which rollers 76 ride. A reaction element 77 is fixed to magnet ring 65 and has a circular hub portion with which rollers 76 engage. In the event magnet 65 is not employed, then the element 77 can be fixed directly to the casing 17.

In describing the control for obtaining the various possible changes of speed, the front magnet will be included as part of the gearing structure. First speed forward results when magnet 65 is effective to hold ring gear 20 stationary, the drive being direct through gearing E and from shaft 39 to shaft 10 through the one-way clutch 46, 47, and 48. Second speed forward results when magnets 65 and 52 are effective, the drive through gearing E being direct and as sun gear 49 is held stationary the rear planetary gearing increases the driving speed flowing thereto in driving the tail shaft. Third speed forward or direct is obtained by making magnet 68 effective to lock the front planetary gearing from which the drive flows through the locked planetary gearing E and through the one-way clutch between shafts 39 and 10. Fourth speed forward, or overdrive, is obtained by energizing magnets 68 and 52 whereupon the drive is direct through gearings D and E, and is increased through gearing F. Reverse drive is obtained by energizing magnet 65, engaging carrier teeth 56 with the teeth of plate 57, to reverse the drive through unit E, and locking unit F by engaging clutch 59 with the teeth of ring 62.

The selection and control of the change speed gearing will now be described. A grounded battery 80 has a conductor line 81 leading therefrom and in such line is a control switch 82 and a signal lamp 83. This line extends to manually adjustable switch mechanism 84 that is under the control of the driver through means of a shift lever 85, located adjacent the vehicle steering wheel 86, and suitable actuating mechanism between the lever and the two movable elements 79 and 87 of the switch mechanism. This actuating mechanism extends through a tube 88 and can be manipulated by the lever to shift clutch sleeves 58 and 59. A link 89 is arranged to be operated by the actuating mechanism and it is connected to a bell crank 90 with which a link 91 is connected. This link 91 is connected to arm 92 with which mechanism (not shown) is connected for simultaneously shifting sleeves 58 and 59. The arrangement is such that the clutch sleeves will be shifted in a desired manner to suit apparatus of the main control switch 84 through actuation of the lever 85.

The main control switch 84 is similar to that in the previously referred to patent and comprises the two movable elements 79 and 87, mounted on a suitable carrier, and a stationary element 94. The main electrical feed line 81 is connected to a contact strip 95 by a terminal 96 having three contacts 95′, 95″, 95‴ with which the contact 97 on movable switch element 87 can engage in its range of movement. The switch element 87 is also provided with contacts 98 and 99 that are adapted to engage with contacts on terminals 100, 101, 102 and 103. The movable switch element 79 is adapted to engage contacts on terminals 104 and 105.

There is a governor controlled switch structure 106 in the control system that is responsive to the rotation of shaft 107 having a gear 108 fixed thereon and meshing with gear 109 formed on the tail shaft. The switch structure comprises four switches 110, 111, 112 and 113. This governor actuated switch structure is responsive to the speed of the tail shaft to automatically make and break the switches in the order to be described hereinafter. This switch structure forms a part of the previously referred to patent.

There is also a circuit control means 114 in the control mechanism having a switch 115 arranged to be normally closed and to be opened by suitable mechanism (not shown) actuated by the mechanism for shifting clutch sleeves 58 and 59 when in engaged relation to establish reverse drive. Such mechanism forms a part of the patent previously referred to.

There is also a switch structure 116 in the control mechanism adapted to be responsive to operation of the accelerator pedal 117 through suitable mechanism. This switch structure includes a pair of switches, one of which will be referred to as the kick-down switch 118 and the other of which will be referred to as the accelerator switch 119. This switch structure forms a part of the patent previously referred to.

There is still another switch structure 120 in the control mechanism suitably connected for response to pressure conditions in the intake manifold 121. This switch structure comprises a switch 122.

Associated with the control mechanism is a control means 123 operable to momentarily close the engine throttle valve and to restore the same to the initial position so that torque in the change speed mechanism will be reduced whenever the magnet 68 is initially energized.

The contact terminal 105 is directly connected with magnet coils 66 and 69 by a conductor line 124 and magnet coil 67 is directly connected with contact terminal 102 by conductor line 125. Conductor line 126 connects terminal contact 103 with switches 111 and 113, and conductor line 127 connects terminal contact 100 with switches 119, 110 and 111. Conductor line 128 connects terminal contact 104 with switches 122 and 111, while conductor line 129 connects switches 113, 118 and 122 with contact terminal 101. Switches 112 and 113 are connected by conductor line 130 and switches 112 and 122 are connected by conductor line 131. Switches 110 and 122 are connected by conductor line 132. The reverse switch 115 is connected to magnet coil 51 by line 133 and to switch 118 by line 134. Line 135 connects switch 119 with magnet coil 67.

Figures 3, 4:
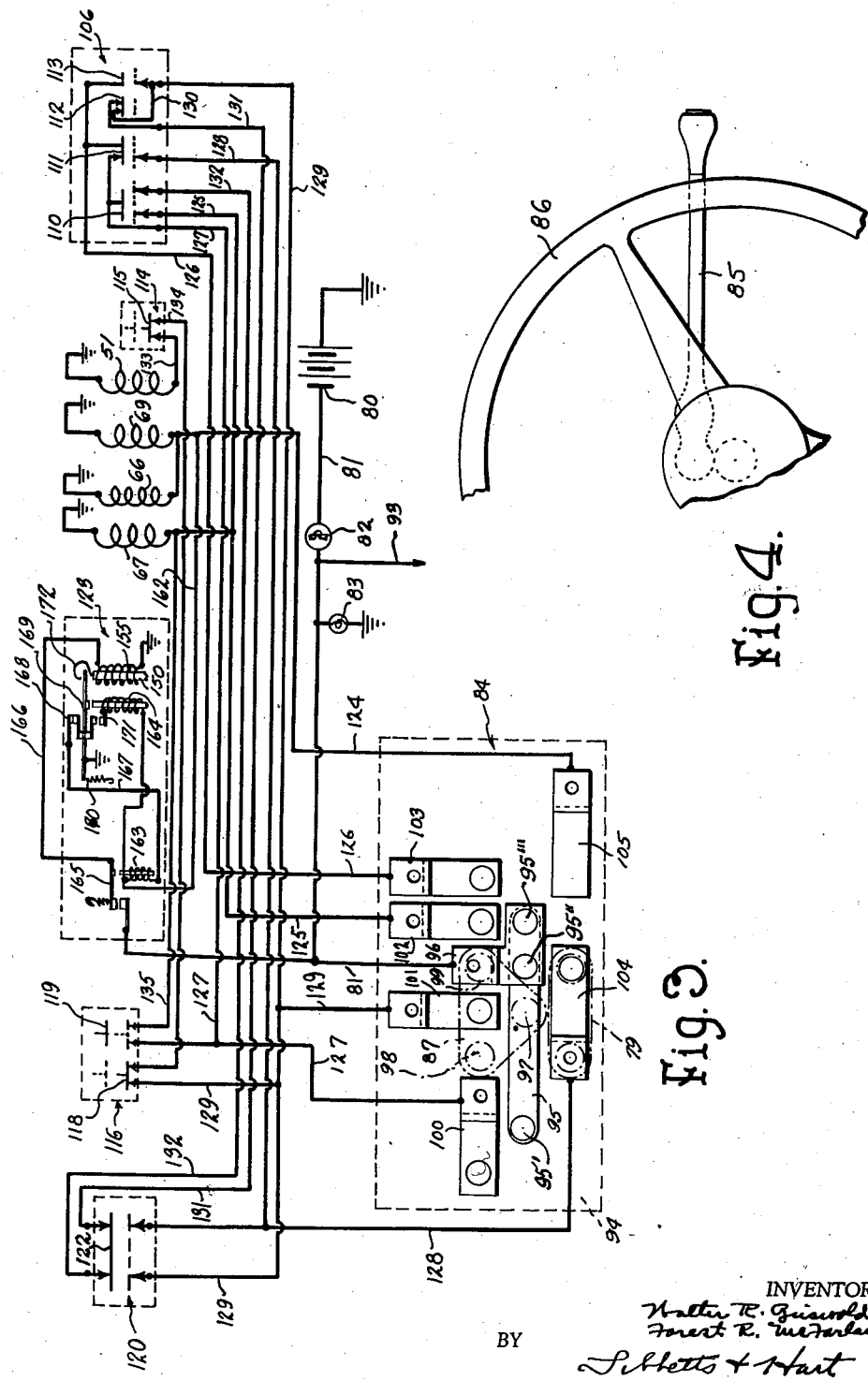
Fig. 3 is a diagrammatic view of the system for controlling the change speed mechanism.
Fig. 4 is a fragmentary plan view of the vehicle steering wheel and the change speed shift lever.

The main manually operable switch structure 84 is adjusted into desired position by suitable manipulation of the lever 85. The elements 79 and 87 of this switch are moved together and element 87 is engageable with contacts 95′, 95″, and 95‴, on the live strip 95, such strip being energized by the battery 80 whenever the switch 82 is closed. This switch 82 may also control the current flow to the engine ignition conduit 93. As shown in Fig. 3, the movable elements of the manually controlled switch are in neutral position so that the magnet coils are dead. The switch can be adjusted to obtain a forward drive at variable speeds, as regulated by the governor switch, vacuum switch and accelerator operated switches, to obtain a forward drive in second speed only, or for reverse drive.

When reverse drive is desired, such selection by the hand lever 85 will move sleeve 58 to lock the carrier 35 with plate 57, will move sleeve 59 to lock with ring 62, will open the switch 115 and will shift the switch element 87 to the left as viewed in Fig. 3 connecting contact 100 with the live strip contact 95′. Current will then flow through line 127 to switch 119 and, upon slight pressure against the accelerator pedal, switch 119 will be closed so that current will flow through line 135 to magnet coil 67. The magnet, thus energized will hold armature 63 and ring gear 20 stationary to thus reduce the drive through planetary gearing D and such drive will be reversed through planetary gearing E as the carrier 35 is held by plate 57. The rear planetary gearing F has been locked by the engagement of fingers 60 with ring 62 and the drive through such gearing will be positive to the tail shaft 10. As coil 51 cannot be energized because of the open switch 115, the control will be fool-proof when in reverse drive.

When forward drive in second speed only is desired, the hand lever 85 is moved to position the switch member 87 in engagement with contacts 101 and 102 to connect lines 129 and 125 with the live strip contact 95″. The reverse switch 115 will be closed and coils 67 and 51 will be energized. Current will flow from line 125 directly to coil 67 and from line 129 through normally closed switch 118 to line 134, switch 115, line 133 to coil 51. Coil 67 will hold armature 63 to reduce the drive through the planetary gearing D, planetary gearing E will be locked for direct drive and sun gear 43 will be held stationary by magnet 52 holding plates 50 in engagement to increase the drive through planetary gearing F. With this arrangement the magnet coils of the change speed gearing are not affected by the action of the governor switch and the drive will remain in second speed forward unless the accelerator pedal is depressed beyond wide open throttle valve position when it will open switch 118, but likelihood of this is remote and unnecessary to maximum engine operation.

By adjusting lever 85 to shift the switch contacts 79 and 87 to the right, as viewed in Fig. 3, so that contact 79 engages terminal contacts 104 and 105 and so that contact 87 connects contact 103 with the live strip contact 95‴, then the control mechanism acts automatically to provide four different forward speed drives through the transmission mechanism. Such setting of the main control switch elements 79 and 87 will energize the conductor line 126 leading to switches 110, 111 and 113 of the governor switch structure and will establish a connection between lines 128 and 124. Assuming that the governor has not closed any of the switches 110, 111, 112, and 113, and it will not under a predetermined tail shaft speed, current will flow through line 126, switches 111 and 110 and through line 127 to the accelerator switch 119. The accelerator switch is normally open but as soon as the accelerator is slightly depressed it will close switch 119 and current will flow through line 135 to coil 67 and thus first speed forward drive is established. The drive will be reduced through the planetary gearing D because the ring gear 20 is held stationary, the planetary gearing E will be locked and the planetary gearing F will be free so the drive from gearing D will pass directly through gearing E and will be transmitted to the tail shaft 10 from shaft 39 through the one-way rollers 47. This first speed circuit will be established when the tail shaft is running below a predetermined speed regardless of the position of the vacuum switch 122.

When the main switch 84 is set for forward drive and the tail shaft speed is above that resulting in first speed drive, just referred to, the governor switch takes entire control of the shift when the vacuum is less than a predetermined value, except as varied by switch 118. However, when the vacuum is more than the predetermined value then the vacuum switch 122 takes control so that the gearing, when in overdrive will remain in overdrive, but as soon as the drive is accelerated so that vacuum drops below the predetermined value then the governor switch takes control to establish the gear relation in accordance with its position at such times.

When the tail shaft is accelerated above maximum first speed drive, the governor will close switch 110 and as conductor line 126 is energized current will flow through switch 111 and 110 to lines 125 and 132. Line 125 connects directly with coil 67 and line 132 leads to switch 122, which, when the vacuum is low, will connect line 132 with line 131 and current will flow from line 131 through switch 112, line 130 to line 129 to switch 118, which is normally closed, and through line 134 to normally closed switch 115 and through line 133 to coil 51. Thus the front planetary ring 20 is held stationary, reducing the drive, the middle planetary gearing is locked together and the sun gear 43 of the rear planetary gearing is held stationary increasing the driving speed through the rear planetary gearing to the tail shaft 10. In this relation second speed forward drive through the transmission automatically results.

To obtain third speed forward, or direct drive, coil 69 must be energized and coils 67 and 51 deenergized. Assuming that vacuum is low so that switch 122 connects lines 131 and 132 and that the tail shaft speed has increased above second speed drive the governor switch 111 will move away from line 127 into engagement with line 128, then current will flow through the conductor line 126 to switch 111 and through line 128 to contact terminals 104 and 105 that are connected by the switch element 79 and then through line 124 to coil 69. While switch 110 connects lines 132, 125 and 127 in first speed and in speeds thereabove, current thereto is broken when the switch 111 moves away from line 127 and engages line 128 and consequently during low vacuum conditions coil 69 will be energized and coils 67 or 51 will be dead. This current flow will also pass to coil 66, the winding of which is in reverse direction to that in which current flows to coil 67. When shifting the current from coil 67 to coil 69, such as in shifting from second speed to direct forward drive, the circular flux around the coil 67 will unduly hold the armature 68 by magnetic force after the coil 69 has been energized, and will thus delay shifting of the armature. By using the coil 66, the residual magnetism of coil 67 will be broken down so that the armature will not be unduly delayed in its movement caused by energizing coil 69.

In shifting into direct forward drive from second speed forward drive, the rotational speed of the armature is considerably different from the speed of magnet 68 so that the engagement causes severe strain on the mechanism and a noticeable jolt. Provision is made to overcome this condition through torque reduction means 123 consisting of a mechanism for temporarily closing the throttle valve when coil 69 is to be energized. The accelerator pedal 117 is connected by link 139 to an arm 140 fixed on shaft 141 suitably mounted on bracket 142. Another arm 143 is fixed to shaft 141 and is connected by link 144 to lever 145, and a link 146 connects one end of this lever to the arm 147 for actuating throttle valve 148 of the carburetor 149.

The throttle lever 145 is connected to be controlled by the device 123 which includes a rod 150 to which the central portion of lever 145 is connected by pivot means 151 carried by link 152 pivotally mounted on a supporting bracket 153 suitably fixed to the engine. When the accelerator pedal is actuated, lever 145 will be rocked on the pivot means 151 as positioned by the rod 150. When the accelerator pedal is depressed, the connection between lever 145 and link 144 will remain stationary and will serve as a fulcrum for lever 145 when the rod 150 is shifted, so in this manner the rod can move the lever to provide a closing movement of the throttle valve when the accelerator pedal is depressed and without exerting any appreciable force against the operator's foot.

Figure 5:
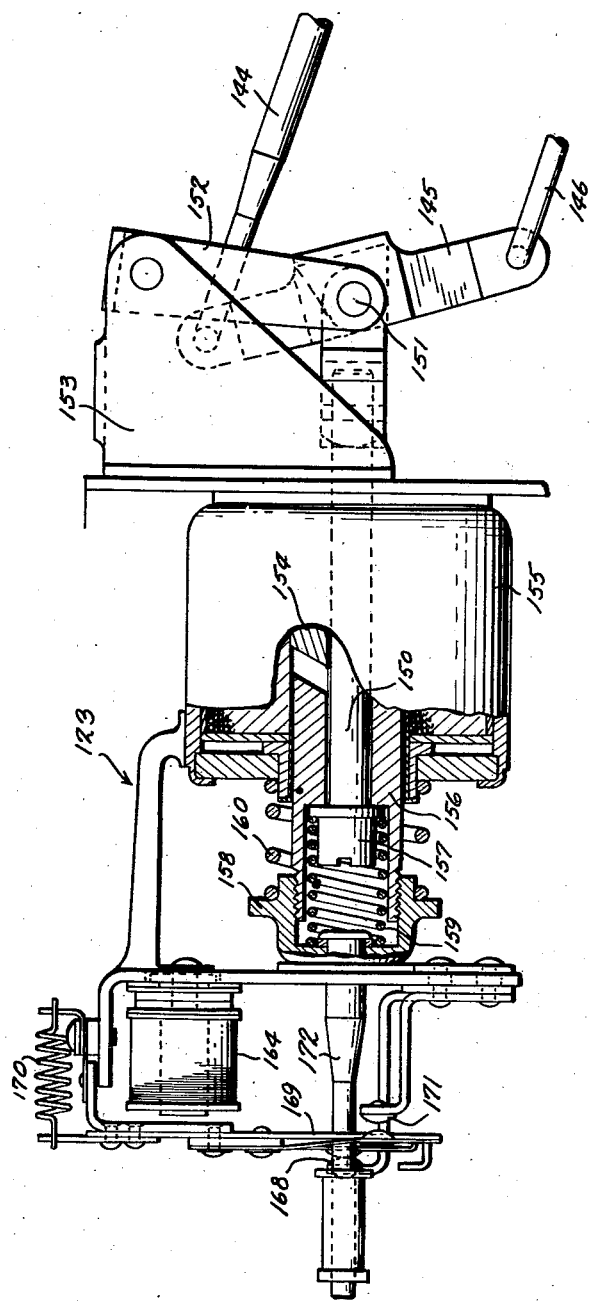
Fig. 5 is a side elevational view, partly in section, of the solenoid control mechanism for the throttle valve that is effective during a shifting operation of the change speed mechanism.

The bracket 153 aalso carries mechanism for operating rod 150 which is responsive to the electrical control system for the shift magnets. As previously stated it is desirable to move the throttle valve in a closing direction when energizing magnet 68, and this is accomplished by moving rod 150 to the right as viewed in Figs. 1 and 5, and downwardly as viewed in Fig. 3, through means of solenoids. Rod 150 extends through core 154 and partly through armature 156 of solenoid 155. The rod has a head portion 157 seated in the armature and enclosed by flanged armature cap 158. Spring 159 in the armature holds the rod head so that the rod moves with the armature and spring 160 normally holds the armature extended so that pivot means 151 is in extreme position for open throttle condition. When the solenoid is energized the armature and rod are moved to the right as viewed in Figs. 1 and 5 and the lever 145 will swing anti-clockwise about its pivotal connection with link 144 to thus cause link 146 to swing the throttle valve in a closing direction and thereby reduce driving torque. This solenoid action is only momentary.

When line 124 is energized, current will flow to coil 69 and from line 124 to conductor line 162 leading to relay coil 163 and to a second solenoid 164 in the throttle control device. The relay coil is connected by line 167 to a switch 168 with which a grounded movable switch member 169 is held in contact by spring 170. Another switch member 171 is connected with the coil of solenoid 164 and is adapted to be contacted by movable switch member 169. When the relay coil is energized it closes a spring opened switch 165 connecting solenoid 155 with the live conductor line 81, and solenoid 155 moves rod 150 to close the throttle valve. The armature cap 158 has an actuator 172 fixed thereto and when the rod 150 is moved to close the throttle valve, actuator 172 moves switch element 169 therewith, breaking its contact with contact element 168 and engaging it with contact element 171. This breaking of the switch element from contact 168 deenergizes relay 163 releasing switch 165 and breaking the circuit to the solenoid 155 so that the lever 145 is returned to its initial position as dictated by the position of the accelerator pedal. At the same time solenoid 164 will hold the switch member 169 out of contact with element 168 until coil 69 is deenergized. Thus at the times magnet coil 69 is energized, the throttle valve will be moved in a closing direction so that driving torque is reduced and a smooth engagement of armature 63 with magnet 68 will occur.

When coil 69 is thus energized and coils 67 and 51 are dead, the front planetary gearing D will be locked together, the middle planetary gearing E will be locked together and the rear planetary gearing F will be free so that there will be direct drive from the power unit which will pass from shaft 39 through the one-way clutch rollers 47 to the tail shaft 10.

Switches 112 and 113 move simultaneously but they are insulated. Switch 112 will connect lines 130 and 131 in first, second and third forward speeds but will disconnect these lines in fourth speed forward, or overdrive, when switches 112 and 113 are moved from their normal positions by the governor mechanism. Thus when the governor speed passes beyond the range for direct drive lines 130 and 131 will be disconnected, line 126 will be connected by switch 113 with line 129, switch 111 will engage line 128 and will be disengaged from line 127, and switch 110 will connect lines 125 and 132. Assuming that vacuum is low, switch 122 will connect lines 131 and 132. Under such circumstances coil 69 will remain energized through the same circuit existing when driving in direct forward speed and a circuit will be established to coil 51 through line 126, switch 113, line 129, switch 118, line 134, switch 115 and line 133. Magnet coils 69 and 51 will thus be energized so that there is a direct drive through the planetary gearing D because the armature 63 is locked to the magnet 68, there will be a direct drive through the middle planetary E and there will be a geared up drive through the planetary gearing F because the sun gear 43 is held by magnet 52.

A somewhat different control of the magnet coils is obtained when the vacuum is high so that switch 122 connects lines 128 and 129 and disconnects lines 131 and 132. When the switches 110, 111, 112 and 113 are in the position shown in Fig. 3, their disengaged position, then, as previously explained, by slightly depressing the accelerator switch 119 coil 67 will be energized and this is so irrespective of the position of the vacuum switch 122.

Assuming that the governor switch mechanism is set for second speed forward, as previously described, with the switch 110 connecting lines 125 and 132, then high vacuum will break the connection through lines 131 and 132 leading to coil 51 so that only coil 67 will be energized, which is the relation for first speed forward drive. Assuming that there is high vacuum and the governor switch is set for direct drive then the switch 111 will engage line 128 and will be disengaged from line 127 so that coil 69 will be energized as previously described for direct drive but coil 51 will also be energized through line 128, switch 122, line 129, switch 118, line 134, switch 115 and line 133 which is the same change speed arrangement in the gearing that is present in overdrive.

When in the overdrive position, shifting of the vacuum switch from low pressure to high pressure position will disconnect lines 131 and 132 and will connect lines 128 and 129 but will have no effect upon the magnets. The same circuit will be retained for magnet coil 51 and a different circuit will be established for magnet coil 69, this latter circuit consisting of the live line 126, switch 113, line 129, switch 122, line 128, contact 104, switch member 79, contact 105 and line 124. With this arrangement of vacuum switch control, the change speed gearing will remain in overdrive position when coasting down from overdrive through second speed forward drive. Thus the mechanism, when decelerating will remain in overdrive relation from a top speed down to approximately eight miles an hour and below such speed the transmission will free wheel. Whenever there is acceleration by stepping on the throttle the speed dictated by the governor position at such time will again be established. Thus, during deceleration, the vacuum switch temporarily takes away the control by the governor switch but the governor switch is reestablished for the position it dictates whenever the accelerator pedal is pressed down.

The kick-down switch 118 is normally closed and is only open when the accelerator pedal is moved beyond wide open throttle position. This movement of the switch is accomplished through means of an actuator 180 operated by a sector 181 fixed on a shaft 141 and effective to operate the switch only after the shaft has been rocked by a further depression of the link 139 beyond position where the throttle valve is wide open. Such opening of the switch 118 will take the control away from the governor switch, when in overdrive position, and will establish direct drive because the circuit to coil 51 is thus broken leaving only coil 69 energized. By allowing return of the accelerator pedal to less than wide open throttle position, the switch 118 will again establish a connection between lines 129 and 134 to again energize coil 51. In this manner, through manipulation of the accelerator pedal the driver, when the governor switch mechanism is in overdrive position, can shift back and forth between direct and overdrive control for the magnets and the change speed mechanism.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. In a transmission mechanism, a casing having a reaction member fixed therein, planetary gearing in the casing including a ring gear, a pinion carrier and a sun gear, a fluid clutch drive shaft in driving relation with the planetary gearing sun gear, a shaft in driven relation with the planetary gearing carrier, magnetic means operable to lock the planetary gearing ring gear and carrier together, and a one-way brake means between said ring gear and said reaction member effective when said magnetic means is ineffective.

2. In motor vehicle change speed gearing in which the driving speed is selected by magnets, means for controlling said magnets to select the driving relation of the gearing automatically in response to actuation of the accelerator pedal comprising a main switch means, a speed actuated switch means, switch means responsive to a predetermined change in vacuum in the motor intake, an accelerator pedal actuated switch, and circuit means controlled by said switches, said speed actuated switch operating to change the circuits to the magnets to shift the gearing as dictated by speed when the engine vacuum is low and said vacuum switch holding the circuit arrangement found present when the vehicle decelerates until low speed is reached, the circuit arrangement dictated by the governor switch being established whenever the vacuum switch shifts from high vacuum position to low vacuum position.

3. Motor vehicle change speed gearing comprising a drive shaft, a driven shaft, a drive and a driven planetary gearing operative in direct driving relation between said shafts, a pair of magnets selectively operable to establish a direct or a modified drive through the drive gearing, a one-way clutch connection operable between the drive planetary gearing and the driven shaft, a magnet operable to hold a portion of the driven planetary gearing for modifying the drive to the driven shaft, circuit establishing means for automatically energizing the magnets to establish one of four driving speeds from the drive shaft to the driven shaft in response to operation of the motor vehicle throttle valve operating mechanism, and control means for the circuits including a speed actuated switch member and a vacuum switch member, said speed actuating member controlling the circuits when the vacuum is low and the vacuum switch nullifying the action of the speed responsive switch member whenever the vacuum is above a predetermined value, said speed switch reestablishing the circuit condition dictated by its normal position whenever the vacuum falls below the predetermined value.

4. In a transmission mechanism, a drive shaft, a tail shaft, an idler shaft intermediate the drive and driven shafts, said shafts being in aligned relation, a planetary gearing driven by the drive shaft and having a sun gear rotatably mounted on the idler shaft, a planetary gearing having a ring gear fixed to the tail shaft and to the idler shaft and a sun gear rotatably mounted on the idler shaft, means connecting the planetary gearings in driving relation with each other, and bearing means between the idler shaft and the sun gears of said planetary gearings.

5. In a transmission mechanism, a drive shaft, a tail shaft, an idler shaft intermediate the drive and driven shafts, said shafts being in aligned relation, a planetary gearing rotatably mounted on the idler shaft adjacent the drive shaft and connected to be driven by the drive shaft, a planetary gearing having a sun gear rotatably mounted on the idler shaft adjacent the tail shaft and a ring gear fixed to rotate with the idler shaft and with the tail shaft, and bearing means between the planetary gearing adjacent the drive shaft and the idler shaft and between the sun gear and the idler shaft.

WALTER R. GRISWOLD.
FOREST R. McFARLAND.